United States Patent
Murakami

(10) Patent No.: US 8,758,889 B2
(45) Date of Patent: Jun. 24, 2014

(54) GAS BARRIER FILM AND DEVICE

(75) Inventor: Tomoo Murakami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 496 days.

(21) Appl. No.: 13/070,949

(22) Filed: Mar. 24, 2011

(65) Prior Publication Data

US 2011/0236660 A1 Sep. 29, 2011

(30) Foreign Application Priority Data

Mar. 25, 2010 (JP) .................................. 2010-070661

(51) Int. Cl.
*B32B 7/02* (2006.01)
*B32B 9/00* (2006.01)
*C08F 30/02* (2006.01)

(52) U.S. Cl.
CPC .............. *B32B 7/02* (2013.01); *B32B 2457/12* (2013.01); *B32B 2457/10* (2013.01); *C08F 30/02* (2013.01)
USPC ........... 428/213; 428/217; 428/220; 428/520; 428/702; 525/20; 525/37

(58) Field of Classification Search
USPC ........... 428/35.7–35.9, 36.9–36.91, 480, 483, 428/212–213, 215–216, 220, 500, 515, 520, 428/688–689, 697–699, 701–702; 525/20, 525/37, 287, 538
See application file for complete search history.

(56) References Cited

U.S. PATENT DOCUMENTS

2007/0231592 A1* 10/2007 Agata ........................... 428/522
2008/0318034 A1* 12/2008 Murakami et al. ............ 428/336
2009/0061223 A1   3/2009 Tsukahara et al.
2009/0324942 A1  12/2009 Tsukahara et al.

FOREIGN PATENT DOCUMENTS

| JP | 9-201897 A | 8/1997 |
|---|---|---|
| JP | 2003-118046 A | 4/2003 |
| JP | 2008-1111 A | 1/2008 |
| JP | 2008-265255 A | 11/2008 |
| JP | 2010-6039 A | 1/2010 |
| JP | 2010-30290 A | 2/2010 |

OTHER PUBLICATIONS

DeLassus, P. "Barrier Polymers". Kirk-Othmer Encyclopedia of Chemical Technology, (2002); pp. 375-407.*
Japanese Office Action, dated May 21, 2013, for Japanese Application No. 2010-070661.

* cited by examiner

*Primary Examiner* — Prashant J Khatri
(74) *Attorney, Agent, or Firm* — Birch, Stewart, Kolasch & Birch, LLP

(57) ABSTRACT

Disclosed is a gas barrier film comprising a substrate film, an organic layer and an inorganic layer provided directly on the surface of the organic layer, wherein the organic layer laid under the inorganic layer has a thickness of from 0.3 μm to 10 μm; the organic layer laid under the inorganic layer has a hardness, measured by the nanoindentation, of 0.03 to 0.5 GPa; and the organic layer laid under the inorganic layer, assumed to have a thickness "a", and the inorganic layer on the organic layer, assumed to have a thickness "b", satisfying a relation of a/b>10. The gas barrier film is excellent in the barrier performance, adhesiveness, bending resistance and scratch resistance.

16 Claims, 1 Drawing Sheet

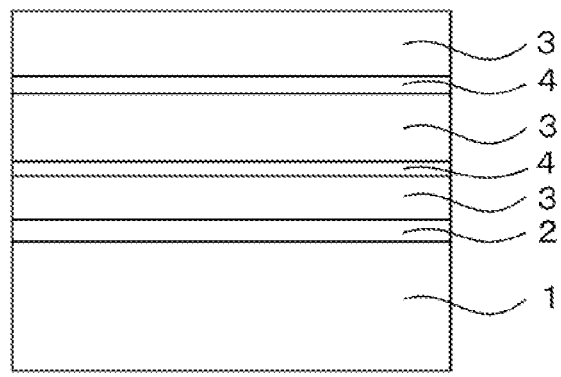

GAS BARRIER FILM AND DEVICE

CROSS-REFERENCE TO RELATED APPLICATIONS

The present application claims the benefit of priority from Japanese Patent Application No. 070661/2010, filed on Mar. 25, 2010, the contents of which are herein incorporated by reference in their entirety.

BACKGROUND OF THE INVENTION

1. Field of the Invention

The present invention relates to a gas barrier film used for substrates of devices such as organic EL device, and a device using the gas barrier film.

2. Description of the Related Art

Barrier performance of gas barrier film is mainly governed by its inorganic layer. Thickening of the inorganic layer contained therein may improve the barrier performance but may make the barrier film more likely to crack. The tendency may be problematic particularly in the process of roller transportation of the gas barrier film. The roller transportation may need some consideration on scratch resistance of the gas barrier film.

Considering the situation, investigations for suppressing cracking of the gas barrier film have been made on so-called organic/inorganic multi-layered gas barrier film having at least one organic layer and at least one inorganic layer. This sort of gas barrier film, in particular a gas barrier film having an inorganic layer between two organic layers, has succeeded in achieving an excellent effect of crack prevention.

This sort of organic/inorganic multi-layered gas barrier film is known by those described in JP-A-2008-1111 and JP-A-H09-201897. The gas barrier films are, however, still at insufficient levels for barrier performance, adhesiveness, and so forth.

SUMMARY OF THE INVENTION

The present invention is aimed at solving the above-described problems, and is to provide a gas barrier film excellent in barrier performance, adhesiveness, and also in bending resistance. It is another object of the present invention to provide a gas barrier film excellent also in scratch resistance.

The present inventors investigated into the related art, and found out that the crack resistance degrades if the organic layer, laid under the inorganic layer, becomes thinner relative to the thickness of the inorganic layer. It was, however, also found that too large thickness of the organic layer, laid under the inorganic layer, degrades the barrier performance, due to intrusion of water from the edge of the organic layer. The present inventors found after our further investigations that the barrier performance, adhesiveness, bending resistance and scratch resistance may remarkably be improved, by precisely controlling conditions of the inorganic layer and the organic layer. More specifically, the present inventors finally found out that the gas barrier film remarkably excellent in the barrier performance, adhesiveness, bending resistance and scratch resistance may be obtained when the organic layer laminated directly on the surface of the inorganic layer has a thickness of from 0.3 µm to 10 µm, the organic layer laminated directly on the surface of the inorganic layer has a hardness, measured by the nanoindentation, of 0.03 to 0.5 GPa, and the organic layer laid under the inorganic layer, assumed to have a thickness "a", and the inorganic layer on the surface of the organic layer, assumed to have a thickness "b", satisfies a relation of a/b>10, and completed present invention. Specific means for embodying the present invention will be described later.

[1] A gas barrier film comprising a substrate film, an organic layer and an inorganic layer provided directly on the surface of the organic layer, wherein the organic layer laid under the inorganic layer has a thickness of from 0.3 µm to 10 µm; the organic layer laid under the inorganic layer has a hardness, measured by the nanoindentation, of 0.03 GPa to 0.5 GPa; and the organic layer laid under the inorganic layer, assumed to have a thickness "a", and the inorganic layer on the organic layer, assumed to have a thickness "b", satisfying a relation of a/b>10.

[2] The gas barrier film of [1], wherein a relation of a/b≥20 is satisfied.

[3] The gas barrier film of [1] or [2], wherein the organic layer laid under the inorganic layer is obtained by curing a polymerizable composition which contains a (meth)acrylate-base compound having a phosphate ester group.

[4] The gas barrier film of [3], wherein the (meth)acrylate-base compound having a phosphate ester group, contained in the organic layer laid under the inorganic layer, is expressed by the following formula (1):

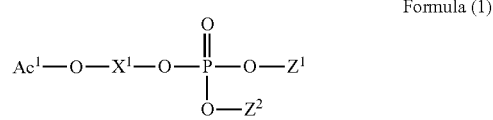

Formula (1)

wherein $Z^1$ represents an $Ac^c$—O—$X^2$—, a substituent having no polymerizable group, or hydrogen atom; $Z^2$ represents an $Ac^3$—O—$X^3$—, a substituent having no polymerizable group, or hydrogen atom; each of $Ac^1$, $Ac^2$ and $Ac^3$ independently represents an acryloyl group or a methacryloyl group; and each of $X^1$, $X^2$ and $X^3$ independently represents an alkylene group, an alkyleneoxy group, an alkyleneoxycarbonyl group, an alkylenecarbonyloxy group, or a group of a combination of these groups; the organic layer laid under the inorganic layer has a glass transition temperature of 100° C. or below; the organic layer laid under the inorganic layer, assumed to have a thickness "a", and the inorganic layer on the organic layer, assumed to have a thickness "b", satisfies a relation of a/b≥30; and the organic layer laid under the inorganic layer has a thickness of from 5 µm to 10 µm.

[5] The gas barrier film of [4], wherein, in formula (1), $Z^1$ represents an $Ac^2$—O—$X^2$— or hydrogen atom; and $Z^2$ represents an $Ac^3$—O—$X^3$— or hydrogen atom.

[6] The gas barrier film of [4] or [5], wherein the organic layer has a glass transition temperature of 85° C. or lower.

[7] The gas barrier film of any one of [1] to [6], comprising at least two layers of the organic layer and at least two layers of the inorganic layer alternately.

[8] The gas barrier film of any one of [1] to [7], further comprising an easy adhesive layer formed on the substrate film.

[9] The gas barrier film of any one of [1] to [8], further comprising an organic layer directly on the surface of the inorganic layer.

[10] The gas barrier film of any one of [1] to [9], wherein the organic layer on the inorganic layer has the same composition as the composition of the organic layer laid under the inorganic layer.

[11] The gas barrier film of any one of [1] to [10], wherein the inorganic layer has a thickness of 5 to 500 nm.

[12] The gas barrier film of any one of [1] to [11], wherein the organic layer laid under the inorganic layer has a thickness of 5 to 10 μm.

[13] The gas barrier film of any one of [1] to [12], wherein a relation of a/b≥20 is satisfied; the organic layer laid under the inorganic layer is obtained by curing a polymerizable composition which contains a (meth)acrylate-base compound having a phosphate ester group; the (meth)acrylate-base compound having a phosphate ester group, contained in the organic layer laid under the inorganic layer, is expressed by the following formula (1):

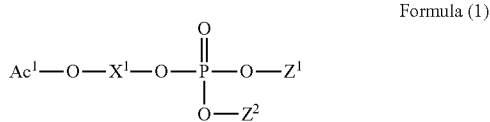

Formula (1)

wherein $Z^1$ represents an $Ac^2$—O—$X^2$—, a substituent having no polymerizable group, or hydrogen atom; $Z^2$ represents an $Ac^3$—O—$X^3$—, a substituent having no polymerizable group, or hydrogen atom; each of $Ac^1$, $Ac^2$ and $Ac^3$ independently represents an acryloyl group or a methacryloyl group; and each of $X^1$, $X^2$ and $X^3$ independently represents an alkylene group, an alkyleneoxy group, an alkyleneoxycarbonyl group, an alkylenecarbonyloxy group, or a group of a combination of these groups; the organic layer laid under the inorganic layer has a glass transition temperature of 100° C. or below; the organic layer laid under the inorganic layer, assumed to have a thickness "a", and the inorganic layer on the organic layer, assumed to have a thickness "b", satisfies a relation of a/b≥30; and the organic layer laid under the inorganic layer has a thickness of from 5 μm to 10 μm.

[14] The gas barrier film of [13], wherein, in formula (1), $Z^1$ represents an $Ac^2$—O—$X^2$— or hydrogen atom; and $Z^2$ represents an $Ac^3$—O—$X^3$— or hydrogen atom.

[15] The gas barrier film of [13] or [14], wherein the organic layer has a glass transition temperature of 85° C. or lower.

[16] The gas barrier film of any one of [13] to [15], comprising at least two layers of the organic layer and at least two layers of the inorganic layer alternately.

[17] The gas barrier film of any one of [13] to [16], further comprising an easy adhesive layer formed on the substrate film.

[18] The gas barrier film of any one of [1] to [17], further comprising an easy adhesive layer formed directly on the surface of the substrate film.

[19] A device having the gas barrier film described in of any one of [1] to [18].

[20] The device of [19], configured as an organic EL device or as a solar battery device.

The present invention enabled to provide a gas barrier film excellent in the barrier performance, adhesiveness, bending resistance and scratch resistance.

In particular, the bending resistance of the gas barrier film may be remarkably improved, by configuring the organic layer laid under the inorganic layer as follows:
the organic layer is obtained by curing a polymerizable composition containing a (meth)acrylate-base compound having a phosphate ester group represented by the formula (1) below;
the organic layer has a glass transition temperature of 100° C. or below;
the organic layer has a hardness, measured by the nanoindentation, of 0.03 to 0.5 GPa;
the organic layer has a thickness of from 5 μm to 10 μm;
and by making the organic layer satisfy a relation of a/b≥30, while assuming the thickness of the organic layer laid under the inorganic layer as "a", and the thickness of the inorganic layer on the surface of the organic layer as "b".

BRIEF DESCRIPTION OF THE DRAWINGS

FIG. 1 is a schematic drawing illustrating an exemplary embodiment of the gas barrier film of the present invention, wherein 1 stands for a substrate film, 2 stands for an easy adhesive layer, 3 stands for an organic layer and 4 stands for an inorganic layer.

BEST MODE FOR CARRYING OUT THE INVENTION

The present invention will be detailed below. Note that expression of all numerical ranges using "to" in this patent specification mean the ranges covering the values placed before and after "to" as the lower and upper limit values, respectively. Note also that organic EL device in the present invention means organic electro-luminescence device.

The gas barrier film of the present invention has a substrate film, an organic layer, and an inorganic layer formed directly on the surface of the organic layer. The organic layer laid under the inorganic layer has a thickness of from 0.3 μm to 10 μm, the organic layer laid under the inorganic layer has a hardness, measured by the nanoindentation, of 0.03 to 0.5 GPa, and the organic layer laid under the inorganic layer, assumed to have a thickness "a", and the inorganic layer on the surface of the organic layer, assumed to have a thickness "b", satisfies a relation of a/b>10. By virtue of this configuration, a gas barrier film excellent in barrier performance, adhesiveness, bending resistance and scratch resistance may be obtained. In this patent specification, the organic layer laid under the inorganic layer herein generally means an organic layer which serves as an underlying layer over which the inorganic layer is provided. In other words, the organic layer laid under the inorganic layer is a layer brought directly adjacent to the inorganic layer, and is generally an organic layer placed on the side closer to the substrate film. Of course, this does not always mean that the organic layer is provided on the lower side of the inorganic layer in final products such as organic EL device.

FIG. 1 illustrates an exemplary embodiment of the gas barrier film of the present invention, wherein reference numeral 1 stands for the substrate film, 2 for the easy adhesive layer, 3 for the organic layers, and 4 for the inorganic layers. In the present invention, thickness "a" of the organic layer 3 and thickness "b" of the inorganic layer 4 provided on the surface thereof satisfy a relation of a/b>10, preferably a/b≥20, and more preferably a/b≥30. This configuration enhances a tendency of improving the bending resistance.

In this embodiment, two or more organic layers and two or more inorganic layers are alternately laminated, wherein it may be good enough that any one pair of organic layer and the inorganic layer provided on the surface thereof satisfy the above-described relation. It may be more preferable that all of the individual inorganic layers and the organic layers laid thereunder satisfy the above-described relation.

It is preferable that both of two layers directly adjacent to the inorganic layer are preferably the organic layers. This configuration enhances a tendency of improving the cracking.

(Organic Layer Laid Under Inorganic Layer)

The organic layer laid under the inorganic layer preferably has a thickness of from 0.3 μm to 10 μm, more preferably from 5 μm to 10 μm. The organic layer in the present invention is preferably an organic layer containing an organic polymer as a major constituent. This means that the organic polymer accounts for the largest part of composition of the organic layer, and generally means that 80 parts by weight or more of composition of the organic layer is the organic polymer.

The organic polymer may be exemplified by thermoplastic resins such as polyester, acrylic resin, methacrylic resin, methacrylate-maleate copolymer, polystyrene, transparent fluorine-containing resin, polyimide, fluorinated polyimide, polyamide, polyamideimide, polyetherimide, cellulose acylate, polyurethane, polyether ether ketone, polycarbonate, alicyclic polyolefin, polyallylate, polyethersulfone, polysulfone, fluorene ring-modified polycarbonate, alicycle-modified polycarbonate, fluorene ring-modified polyester and acryloyl compound; and organo-silicon polymer such as polysiloxane.

The organic layer laid under the inorganic layer of the present invention preferably has a glass transition temperature (Tg) of 100° C. or below, and more preferably 85° C. or below. The lower limit value is preferably −20° C. or above, although not specifically limited.

The organic layer in the present invention is preferably a cured article of a polymerizable composition containing a polymerizable compound.

(Polymerizable Compound)

The polymerizable compound is preferably a cation polymerizable compound having a radical polymerizable compound and/or ether group as a functional group, and is more preferably a compound having an ethylenic unsaturated bond at the terminal or in a side chain, and/or, a compound having an epoxy or oxetane at the terminal or in a side chain. Of those, the compound having an ethylenic unsaturated bond at the terminal or in the side chain is preferable. The Compound having an ethylenic unsaturated bond at the terminal may be exemplified by (meth)acrylate-base compound, acrylamide compounds, styrene compounds, and maleic anhydride. (Meth)acrylate-base compounds and/or styrene compounds are preferable, and (meth)acrylate-base compound is more preferable.

(Meth)acrylate preferably adoptable to the present invention include (meth)acrylate, urethane (meth)acrylate, polyester (meth)acrylate, and epoxy(meth)acrylate.

The styrene compounds preferably adoptable herein include styrene, α-methylstyrene, 4-methylstyrene, divinylbenzene, 4-hydroxystyrene, and 4-carboxystyrene.

Specific examples of the (meth)acrylate-base compounds preferably adoptable to the present invention will be shown below, without limiting the present invention.

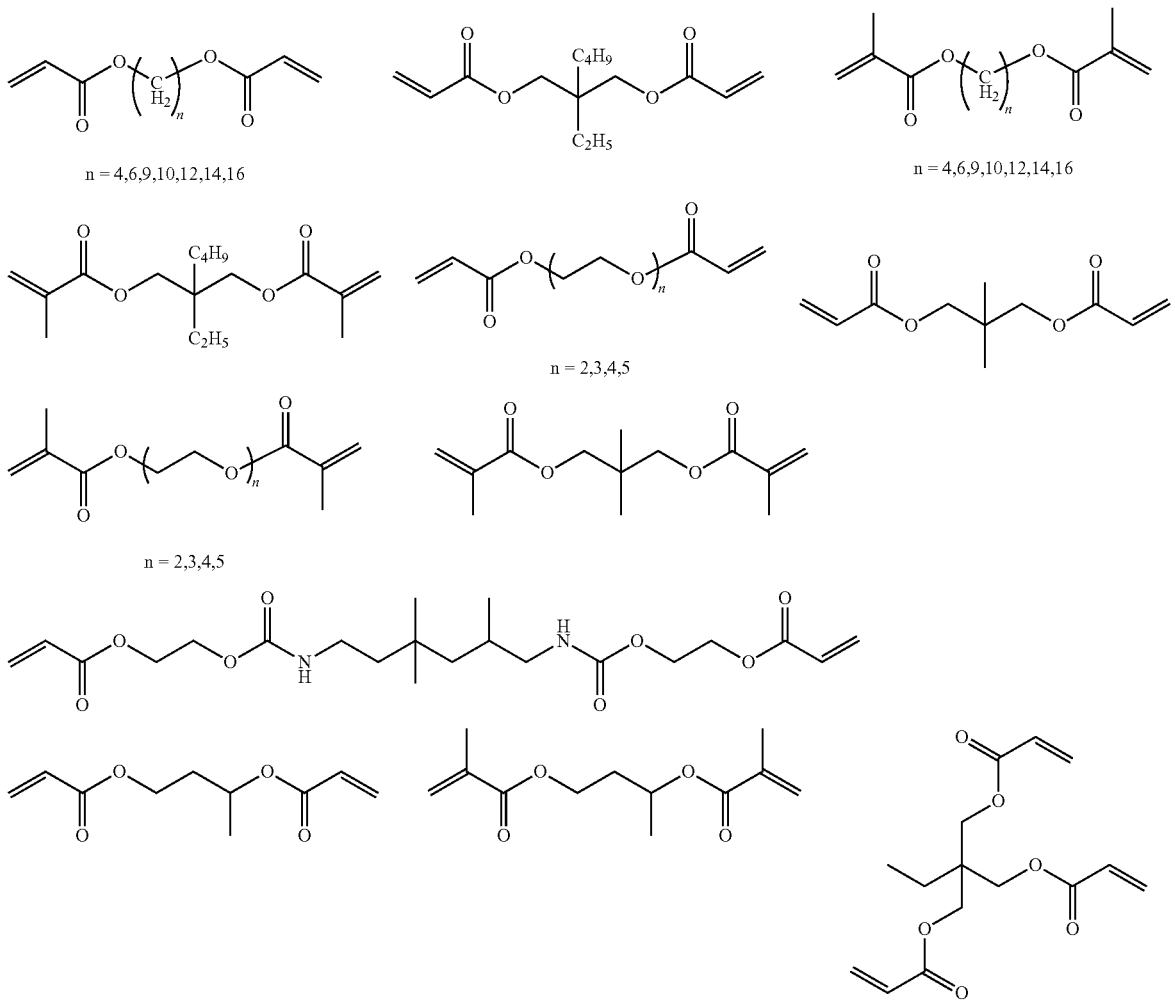

-continued
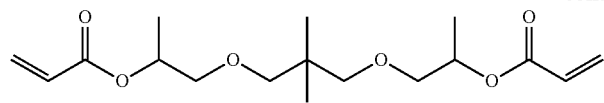
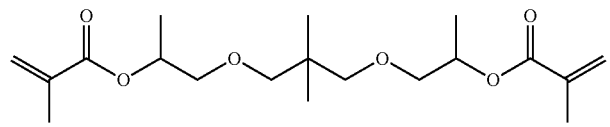
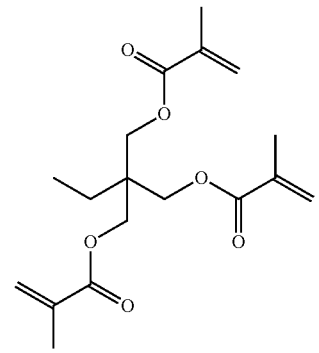
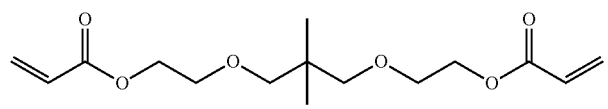
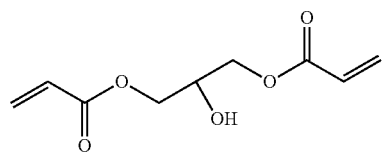
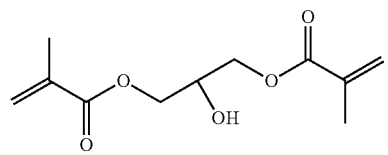
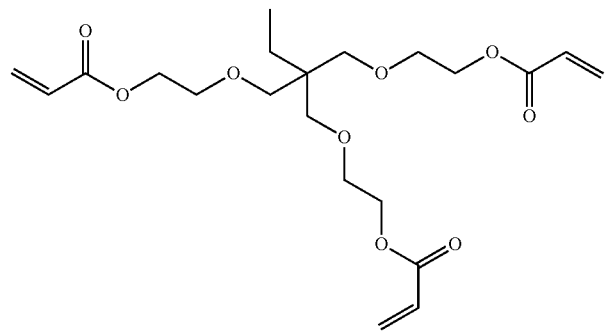
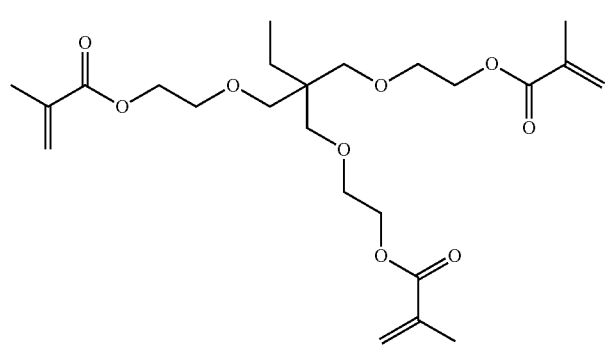
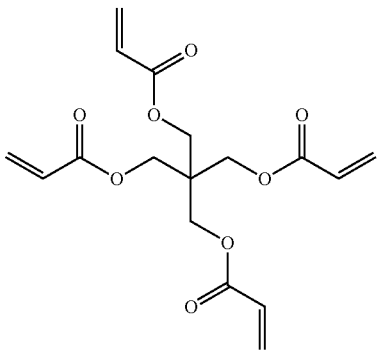

-continued
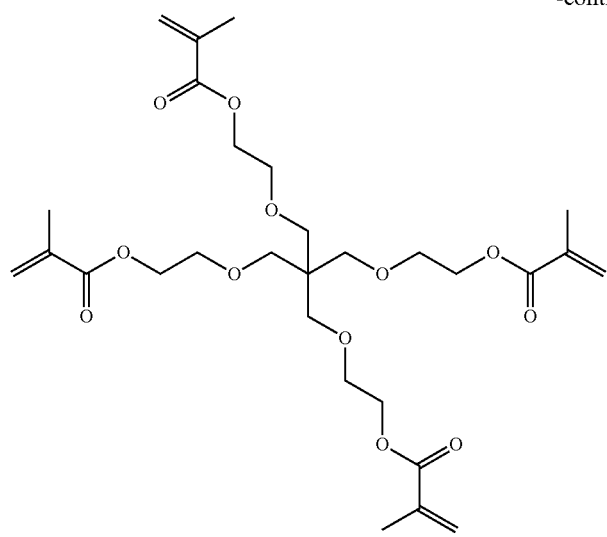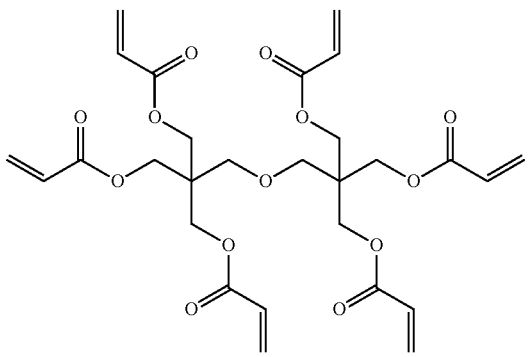
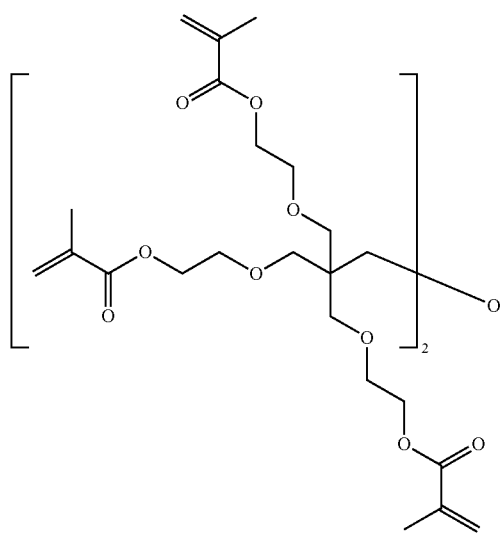
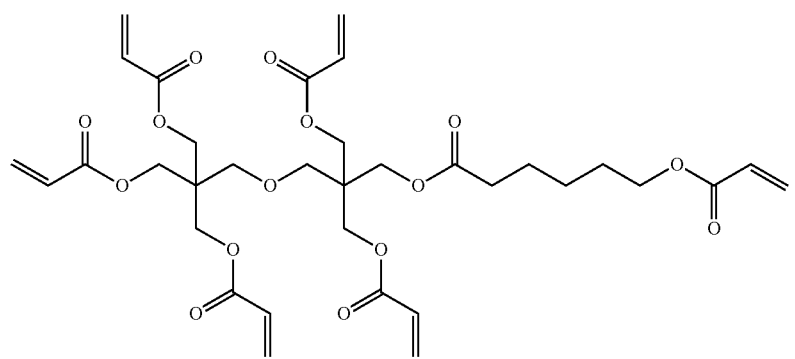

-continued
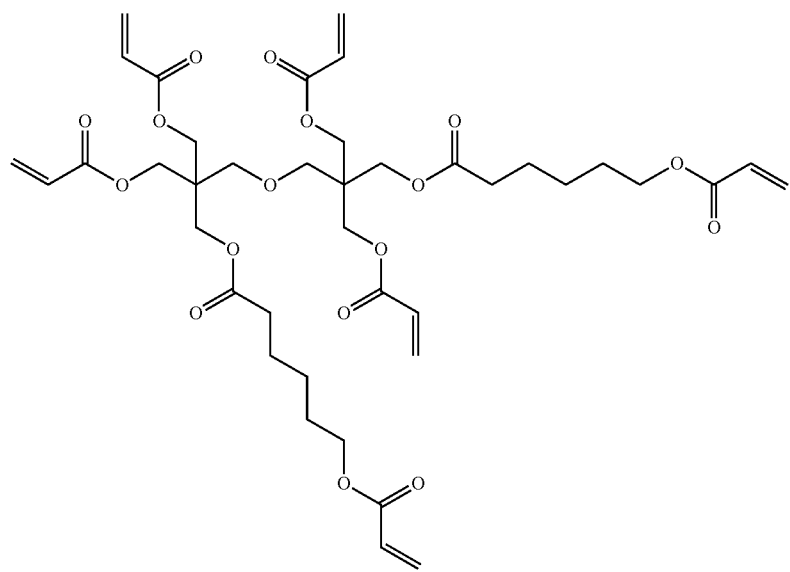
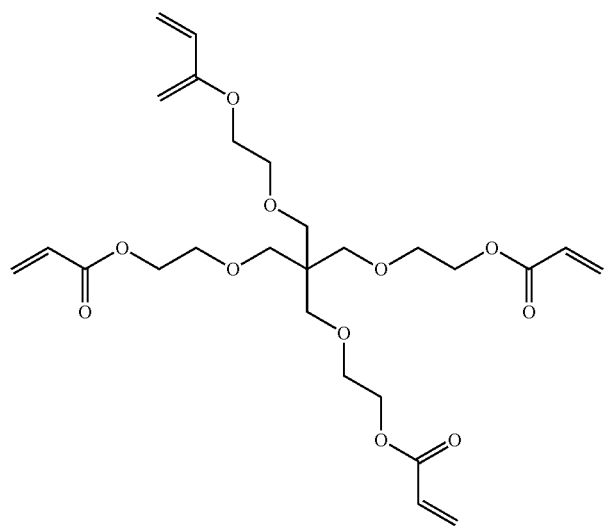
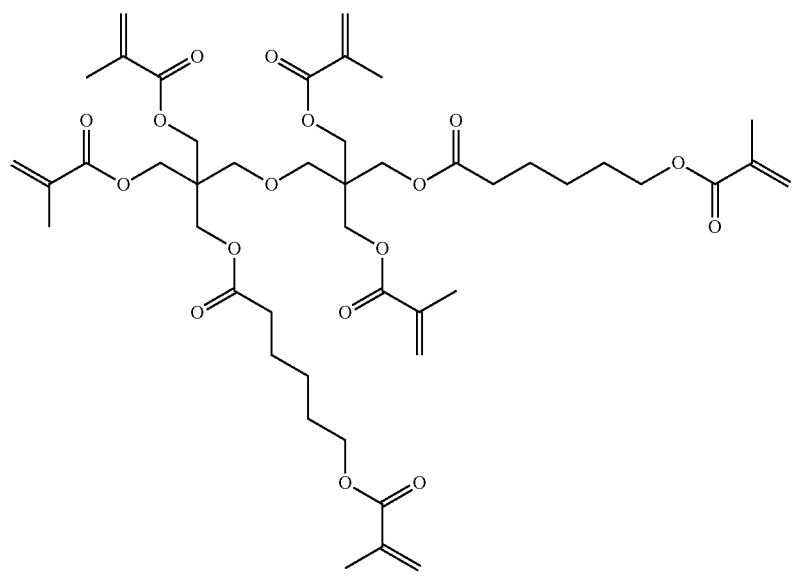

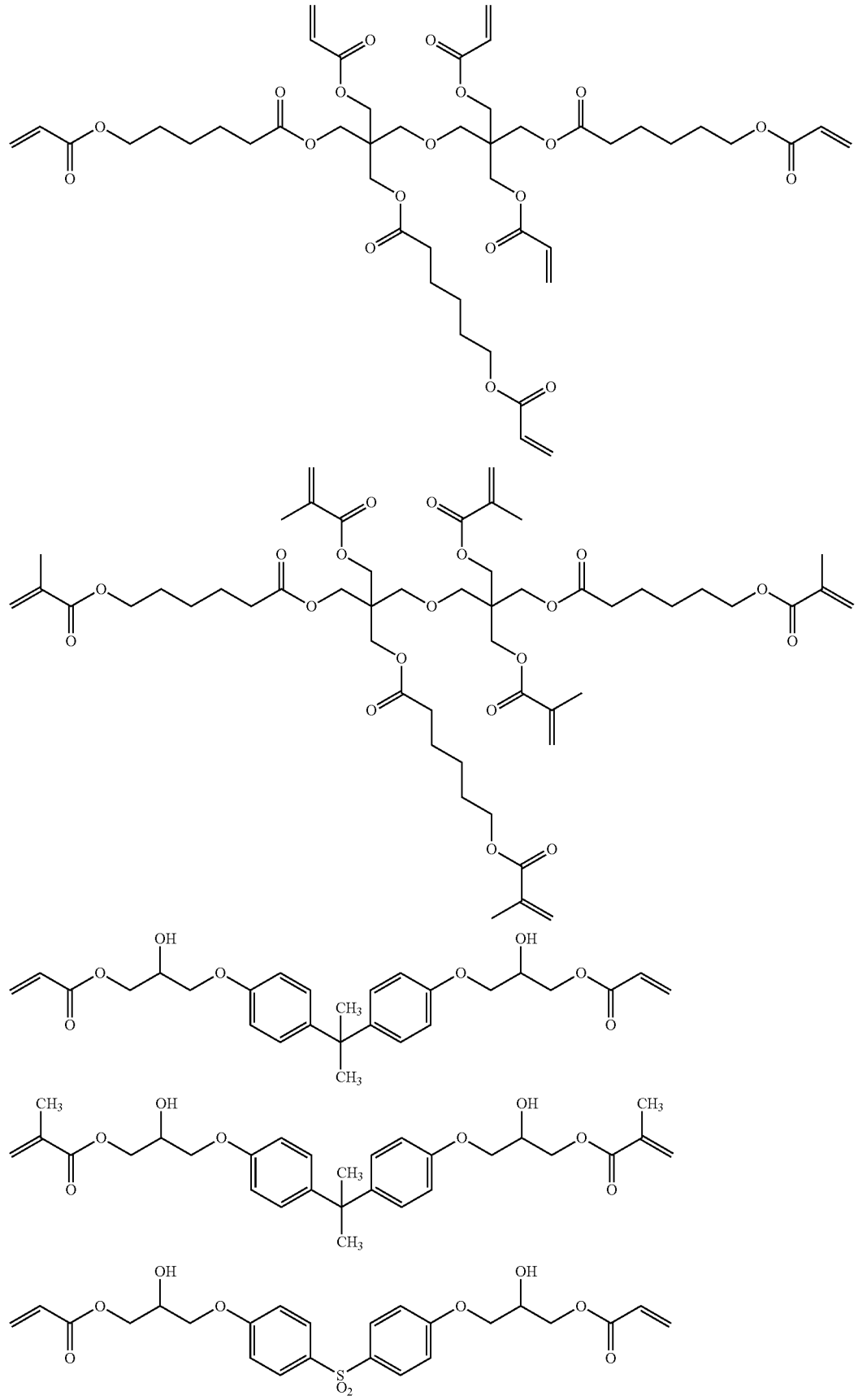

-continued

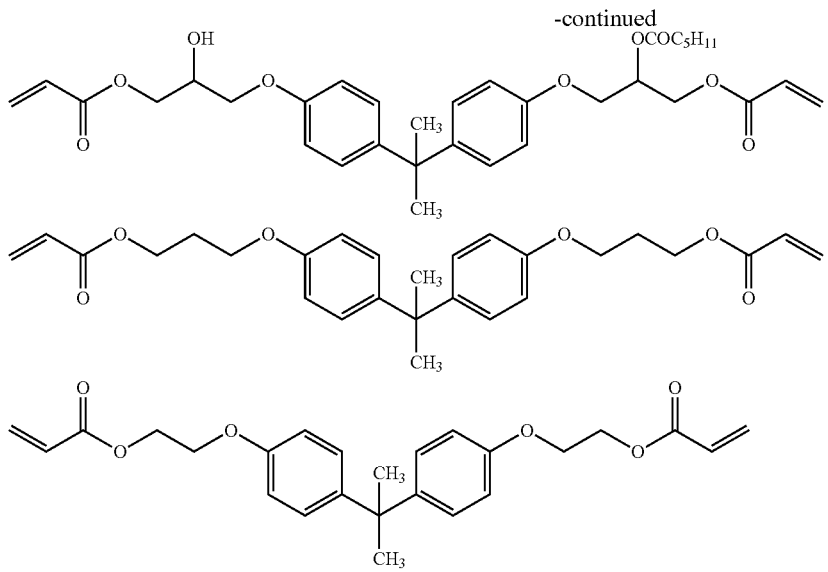

(Monomer Having Phosphate Ester Group)

The polymerizable composition in the present invention preferably contains a monomer having a phosphate ester group, and more preferably contains a (meth)acrylate-base compound having a phosphate ester group. The (meth)acrylate-base compound having a phosphate ester group preferably adoptable herein is represented by formula (1) below. By containing the (meth)acrylate-base compound having a phosphate ester group, the organic layer may be improved in the adhesiveness with the inorganic layer. Formula (1)

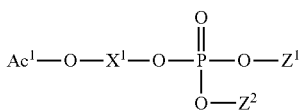

wherein, $Z^1$ represents an $Ac^2$—O—$X^2$—, a substituent having no polymerizable group, or hydrogen atom; $Z^2$ represents an $Ac^3$—O—$X^3$—, a substituent having no polymerizable group, or hydrogen atom; each of $Ac^1$, $Ac^2$ and $Ac^3$ independently represents an acryloyl group or a methacryloyl group; and each of $X^1$, $X^2$ and $X^3$ independently represents an alkylene group, an alkyleneoxy group, an alkyleneoxycarbonyl group, an alkylenecarbonyloxy group, or a group of a combination of these groups.

In formula (1), it is preferable that $Z^1$ represents an $Ac^2$—O—$X^2$— or hydrogen atom, and $Z^2$ represents an $Ac^3$—O—$X^3$— or hydrogen atom. At least one of $Z^1$ and $Z^2$ preferably represents a hydrogen atom. It is also preferable that each of $X^1$, $X^2$ and $X^3$ independently represents an alkylene group having 2 to 8 carbon atoms, an alkyleneoxy group having 2 to 8 carbon atoms, an alkyleneoxycarbonyl group having 2 to 8 carbon atoms, an alkylenecarbonyloxy group having 2 to 8 carbon atoms, or a group of a combination of these groups. The alkylene chain owned by these groups is preferably —$(CH_2)_x$— (x represents an integer from 2 to 8).

In the present invention, only a single species of these monomers expressed by formula (1) may independently be used, or two or more of them may be used in combination.

In the present invention, the polymerizable compound having the above-described phosphate ester group may commercially be available under the trade names KAYAMER Series from NIPPON KAYAKU Co., Ltd., Phosmer Series from Uni-Chemical Co., Ltd. and so forth, which may be used without modification; or may newly be synthesized. An exemplary method of synthesis is described in U.S. Pat. No. 5,004,646.

The (meth)acrylate-base compound having a phosphate ester group preferably adoptable to the present invention will be exemplified below, of course without limiting the present invention.

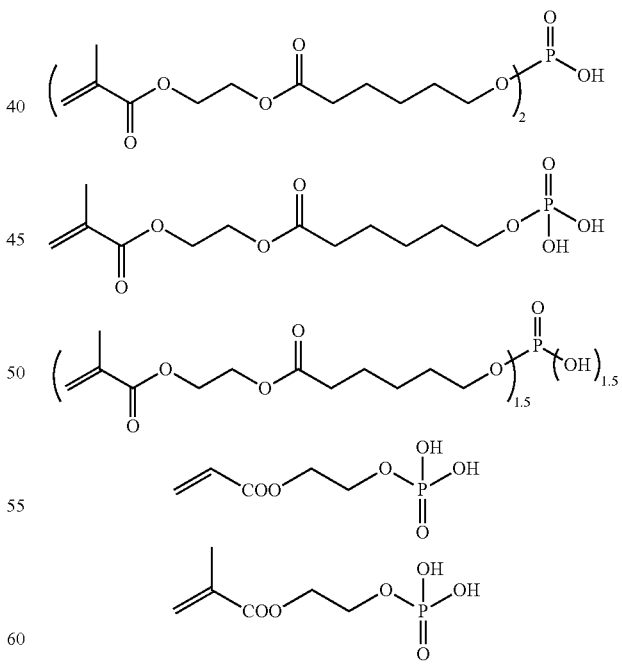

The (meth)acrylate-base compound having a phosphate ester group is preferably contained in the polymerizable composition to as much as 0.01 to 50 parts by weight, and more preferably to as much as 0.1 to 30 parts by weight. The upper limit of the content in the polymerizable composition is preferably 50 parts by weight or below, and more preferably 30 parts by weight or below, in total with the polymerizable compound of the present invention. By adjusting the content in this range, non-conformity (bleeding) ascribable to leakage of heat migration of uncured component may become less likely to occur, even if conditions for curing should be insufficient.

The polymerizable composition adoptable to the present invention is preferably a polymerizable composition, wherein 95 parts by weight or more of which is occupied by the (meth)acrylate-base compound composed only of carbon atoms, oxygen atoms and hydrogen atoms, and the (meth)acrylate-base compound having a phosphate ester group.
(Polymerization Initiator)

The polymerizable composition in the present invention may include a polymerization initiator. In the case where a photopolymerization initiator is used, its amount is preferably at least 0.1 mol % of the total amount of the polymerizing compound, more preferably from 0.5 to 2 mol %. By setting the thus-designed composition, polymerization reaction though an active ingredient forming reaction may be suitably controlled. Examples of the photopolymerization initiator include Ciba Specialty Chemicals' commercial products, Irgacure series (e.g., Irgacure 651, Irgacure 754, Irgacure 184, Irgacure 2959, Irgacure 907, Irgacure 369, Irgacure 379, Irgacure 819), Darocure series (e.g., Darocure TPO, Darocure 1173), Quantacure PDO; Lamberti's commercial products, Ezacure series (e.g., Ezacure TZM, Ezacure TZT, Ezacure KTO46), etc
(Method of Formation of Organic Layer Laid Under Inorganic Layer)

The method for forming the organic layer is not specifically defined. For example, the layer may be formed according to a solution coating method or a vacuum film formation method. The solution coating method is, for example, a dipping method, an air knife coating method, a curtain coating method, a roller coating method, a wire bar coating method, a gravure coating method, a slide coating method, or an extrusion coating method using a hopper as in U.S. Pat. No. 2,681,294. The vacuum film formation method is not specifically defined, but is preferably a film formation method by vapor deposition or plasma CVD. In the present invention, the polymer may be applied for coating as its solution, or a hybrid coating method along with an inorganic material, as in JP-A 2000-323273 and 2004-25732, may also be used.

In the present invention, the composition comprising the polymerizable monomer is cured by irradiation. The light for irradiation is generally a UV ray from a high-pressure mercury lamp or low-pressure mercury lamp. The radiation energy is preferably at least 0.1 J/cm$^2$, more preferably at least 0.5 J/cm$^2$. (Meth)acrylate series compounds may suffer from interference in polymerization owing to oxygen in air, and therefore, in their polymerization, the oxygen concentration or the oxygen partial pressure is preferably lowered. In the case where the oxygen concentration in polymerization is lowered according to a nitrogen purging method, the oxygen concentration is preferably not more than 2%, more preferably not more than 0.5%. In the case where the oxygen partial pressure in polymerization is lowered by a pressure reduction method, the whole pressure is preferably not more than 1000 Pa, more preferably not more than 100 Pa. Especially preferred is UV polymerization with at least 0.5 J/cm$^2$ energy radiation under a condition of reduced pressure of not more than 100 Pa.

Preferably, the rate of polymerization of monomer is mot less than 85%, more preferably not less than 88%, even more preferably not less than 90%, still more preferably not less than 92%. The rate of polymerization as referred to herein means the ratio of the reacted polymerizable group to all the polymerizing group (acryloyl group and methacryloyl group) in the monomer mixture. The rate of polymerization may be quantitatively determined according to IR absorptiometry.

The mean roughness (Ra) at 1 μm square of the organic layer is preferably not more than 1 nm, more preferably not more than 0.5 nm. The surface of the organic layer is required not to have impurities and projections such as particles. Accordingly, it is desirable that the organic layer is formed in a clean room. The degree of cleanness is preferably not more than class 10000, more preferably not more than class 1000.

Although the hardness of the organic layer is preferably higher, but the hardness of the organic layer too high, there may be problematic in the bending resistance and the like. The hardness of the organic layer may be expressed as a microhardness based on the nanoindentation method. The microhardness of the organic layer is preferably 0.03 to 0.5 GPa, more preferably 0.03 to 0.3 GPa. By setting such a range, the bending resistance is improved and the scratch resistance maybe enhanced up to the level that is not practically problem.
(Other Organic Layer)

Other organic layers which are an organic layer other than the organic layer laid under the inorganic layer, for example, the outermost organic layer in FIG. 1 are not particularly limited for the composition, the producing method, and other various conditions. Preferably the other organic layer is the same as the organic layer laid under inorganic layer.
(Inorganic Layer)

The inorganic layer is, in general, a layer of a thin film formed of a metal compound. For forming the inorganic layer, employable is any method capable of producing the intended thin film. For it, for example, suitable are physical vapor deposition methods (PVD) such as vapor evaporation method, sputtering method, ion plating method; various chemical vapor deposition methods (CVD); liquid phase growth methods such as plating or sol-gel method. Not specifically defined, the component to be in the inorganic layer may be any one satisfies the above-mentioned requirements. For example, it includes metal oxides, metal nitrides, metal carbides, metal oxide-nitrides, or metal oxide-carbides. Preferably used are oxides, nitrides, carbide oxide-nitrides, or oxide-carbides comprising at least one metal selected from Si, Al, In, Sn, Zn, Ti, Cu, Ce and Ta. Of those, preferred are oxides, nitrides carbide oxide-nitrides, or oxide-carbides of a metal selected from Si, Al, In, Sn, Zn and Ti; more preferred are metal oxides, nitrides or oxide-nitrides with Si or Al. These may contain any other element as a subsidiary component.

Preferably, the surface smoothness of the inorganic layer formed in the present invention is less than 1 nm in terms of the mean roughness (Ra value) in 1 μm square, more preferably not more than 0.5 nm. Accordingly, it is desirable that the inorganic layer is formed in a clean room. Preferably, the degree of cleanness is not more than class 10000, more preferably not more than class 1000.

Not specifically defined, the thickness of the inorganic layer is generally within a range of from 5 to 500 nm/layer, preferably from 50 to 400 nm/layer, further more preferably from 100 to 200 nm/layer.
(Lamination of Organic Layer and Inorganic Layer)

The organic layer and the inorganic layer may be laminated by repeated film formation to form the organic layer and the inorganic layer in a desired layer constitution. In case where the inorganic layer is formed according to a vacuum film formation method such as sputtering method, vacuum evaporation method, ion plating method or plasma CVD method, then it is desirable that the organic layer is also formed according to a vacuum film formation method such as the above-mentioned flash vapor deposition method. While the barrier layer is formed, it is especially desirable that the organic layer and the inorganic layer are laminated all the time in a vacuum of not more than 1000 Pa, not restoring the pressure to an atmospheric pressure during the film formation. More preferably, the pressure is not more than 100 Pa, even more preferably not more than 50 Pa, still more preferably not more than 20 Pa.

The numbers of the organic layers and the inorganic layers each are not particularly limited, and each are generally 3 to 30.

(Functional Layer)

The device of the present invention may have a functional layer on the barrier laminate or in any other position. The functional layer is described in detail in JP-A 2006-289627, paragraphs 0036 to 0038. Examples of other functional layers than those are a matting agent layer, a protective layer, an antistatic layer, a planarizing layer, an adhesiveness improving layer, a light shielding layer, an antireflection layer, a hard coat layer, a stress relaxing layer, an antifogging layer, an anti-soiling layer, a printable layer, an easy adhesive layer, etc.

In particular, the gas barrier film of the invention preferably has an easy adhesive layer, and more preferably has an easy adhesive layer on the substrate film at the same side as the organic layer is provided.

(Substrate Film)

The gas barrier film of the present invention generally has a plastic film as the substrate film. The preferable scope of the substrate film is the substrate film disclosed in JP-2009-172993, paragraph 0009 to 0012.

(Device)

The gas barrier film of the present invention are favorably used for devices that are deteriorated by the chemical components in air (e.g., oxygen, water, nitrogen oxide, sulfur oxide, ozone). Examples of the devices are, for example, organic EL devices, liquid-crystal display devices, thin-film transistors, touch panels, electronic papers, solar cells, other electronic devices. More preferred are organic EL devices.

The gas barrier film of the present invention may be used as a substrate of a device or as a film for sealing up according to a solid sealing method. The solid sealing method comprises forming a protective layer on a device, then forming an adhesive layer and a gas barrier film as laminated thereon, and curing it. Not specifically defined, the adhesive maybe a thermosetting epoxy resin, a photocurable acrylate resin, etc.

(Organic El Device)

Examples of an organic EL device with a gas barrier film are described in detail in JP-A-2007-30387.

(Liquid-Crystal Display Device)

Examples of a liquid-crystal display device are disclosed in JP-A-2009-172993, paragraph 0044.

(Solar Cell)

The gas barrier film of the invention can be used also as a sealing film for solar cell devices. Preferably, the gas barrier film of the invention is used for sealing a solar cell device in such a manner that its adhesive layer is on the side near to the solar cell device. The solar cell devices for which the gas barrier film of the invention is favorably used are not specifically defined. For example, they include single crystal silicon-based solar cell devices, polycrystalline silicon-based solar cell devices, single-junction or tandem-structure amorphous silicon-based solar cell devices, gallium-arsenic (GaAs), indium-phosphorus (InP) or the like III-V Group compound semiconductor-based solar cell devices, cadmium-tellurium (CdTe) or the like II-VI Group compound semiconductor-based solar cell devices, copper/indium/selenium (CIS-based), copper/indium/gallium/selenium (GIGS-based), copper/indium/gallium/selenium/sulfur (CIGSS-based) or the like Group compound semiconductor-based solar cell devices, dye-sensitized solar cell devices, organic solar cell devices, etc. Above all, in the invention, the solar cell devices are preferably copper/indium/selenium (CIS-based), copper/indium/gallium/selenium (GIGS-based), copper/indium/gallium/selenium/sulfur (CIGSS-based) or the like I-III-VI Group compound semiconductor-based solar cell devices.

<Electronic Paper>

The gas barrier film of the invention can be used in an electronic paper. The electronic paper is a reflection-type electronic display capable of attaining a high precision and a high contrast.

The electronic paper has a display media and a TFT driving the display media on a substrate. Any known display media can be used in the electronic paper. For example, any display media of electophoretic-type, electopowder flight-type, charged tonner-type, electrochromic type can be preferably used. Among them, electrophoretic display media is more preferable and microcapsule-type electophoretic display media is particularly preferable. The electrophoretic display media has a plural number of capsules and each capsule has at least one particle capable of moving in a suspension flow. The at least one particle is preferably an electrophoretic particle or a spinning ball. The electrophoretic display media has a first plane and a second plane that are placed in parallel, and an image is displayed through one of the two planes.

A TFT formed on a substrate comprises a gate electrode, gate insulating layer, an active layer, a source electrode and a drain electrode. A TFT also comprises a resistance layer between the active layer and the source electrode and/or between the active layer and the drain electrode to attain electric connection.

When a color display with a high precision is produced, TFT's are preferably formed on a color filter to precisely align them. Normal TFT with a low electric efficiency can not be down-sized much while obtaining the necessary driving current, and when a high precision display is pursued, the rate of the area for the TFT in a pixel must be high. When the rate of the area for the TFT is high, the rate of the opening area and contrast are low.

Even when a transparent amorphous IGZO-type TFT is used, light transmittance is not 100% and reduction of contrast is unavoidable. Use of the TFT disclosed in JP-A 2009-21554 and the like can reduce the rate of the TFT in a pixel and improve the rate of the opening area and contrast. High precision can also be attained by forming this type of TFT on a color filter directly.

(Others)

Other applications of the invention are thin-film transistors as in JP-T H10-512104, and touch panels as in JP-A 5-127822, 2002-48913.

(Optical Member)

Examples of an optical member are disclosed in JP-A-2009-172993, paragraph 0046.

EXAMPLES

Example 1

1. Manufacturing of Gas Barrier Film

A polyethylene naphthalate (PEN) film (Teonex Q65FA from Teijin DuPont Films Japan Limited) with an easy adhesive layer was cut into 20 cm×20 cm squares, and the organic layers and the inorganic layers were formed on the easy adhesive layer according to procedures described below, to thereby manufacture gas barrier film sample No. 1.

(1-1) Formation of Organic Layer

On the surface of the easy adhesive layer of the PEN film, a polymerizable composition composed of 9 g of polymerizable acrylate (EBECRYL3702, from DAICEL-CYTEC Co., Ltd.), 1 g of phosphoric acid ester monomer (A) shown below (synthesized by the inventors), 0.6 g of UV polymerization initiator (CIBA Irgacure 907, from CIBA Specialty Chemicals), and 190 g of 2-butanone, was coated using a wire bar coater. The thus-coated organic layer was irradiated with UV using a high-pressure mercury lamp (at a cumulative irradiation dose of approximately 1 J/cm$^2$) in a chamber in which oxygen concentration is reduced to 0.1% by replacement with nitrogen, to thereby form a cured organic layer of 0.55 μm thick.

The phosphoric acid ester monomer (A) is allyldiphenylphosphine oxide, from Sigma-Aldrich Corporation, and represented by the formula below.

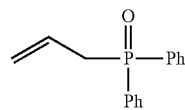

In the formula, Ph represents a phenyl group.

(1-2) Formation of Inorganic Layer

An inorganic layer (aluminum oxide layer) was formed on the surface of the organic layer, using a sputtering apparatus. Aluminum, argon, and oxygen were used as a target, a discharge gas, and a reactive gas, respectively. Pressure in the chamber was 0.1 Pa, and the final thickness of film was 50 nm. In this way, the inorganic layer was stacked on the surface of the organic layer.

(1-3) Formation of Organic Layer and Inorganic Layer

Another organic layer was formed on the surface of the thus-formed inorganic layer by a method similar to that described in (1-1), and another inorganic layer was further formed on the surface of the thus-formed organic layer by a method similar to that described in (1-2).

<Measurement of Hardness>

Hardness of the organic layer of the thus-obtained gas barrier film was measured according to the method described in Japanese JP-A-2004-354842.

<Measurement of Moisture Permeability (Barrier Performance) Based on MOCON Method>

Moisture permeability at 40° C./90% RH (relative humidity) was measured using a water vapor transmission rate testing system (PERMATRAN-W3/31, from MOCON, Inc.). The lower detection limit of the measurement is 0.005 g/m$^2$/day.

<Adhesiveness Test>

Cross-cut test conforming to JIS K5400 as carried out, for the purpose of evaluating adhesiveness of the gas barrier film. The surface of the thus-configured gas barrier film was cut cross-wise at 1-mm intervals using a cutting edge so as to form a 100-cell grid. A 2-cm-wide Mylar (polyester) tape (No. 31B, from NITTO DENKO Corporation) was placed on the laminated film, and then peeled off using a tape exfoliation tester. The number of cells (n) remained unexfoliated on the laminated film, out of 100 cells, were counted.

○: 70 cells or more;

Δ: 50 cells or more, and less than 70 cells; and

×: less than 50 cells.

<Bending Resistance Test>

Bending resistance was tested according to the cylindrical mandrel method (JIS K6500-5-1), while directing the laminated film of each sample outward. The sample after the bending was inspected for cracking under an optical microscope. The bending resistance was expressed by a maximum diameter (mm) of bending not causative of cracking, where a practically acceptable value is smaller than 11 mm.

<Scratch Resistance>

The laminated film of each sample was scratched using a scratch resistance tester attached with a 0.05-mm-radius sapphire stylus (Type 18, from SHINTO Scientific Co., Ltd.). The scratch resistance (g) was expressed by a load under which the film starts to flaw.

○: 25 g or above;

Δ: 20 g or above, below 25 g; and

×: below 20 g.

Gas barrier film samples No. 2 to 20 were manufactured similarly to sample No. 1, except that the materials, the configuration of film and thickness of layers were modified as listed in Table 1. Phosphoric acid ester monomer (B) and phosphoric acid ester monomer (C) listed herein are represented by the formulae below. Phosphoric acid ester monomer (B) is available under the trade name Phosmer PROM from Uni-Chemical Co., Ltd.), the phosphoric acid ester monomer (C) is available under the trade name KAYAMER PM-21, from NIPPON KAYAKU Co., Ltd., given by the formulae below. In Table 1, the thickness of the organic layer is given in μm, whereas the thickness of the inorganic layer is given in nm. Ratio of thickness (a/b) was, however, calculated based on a common unit.

Phosphoric Acid Ester Monomer (B)

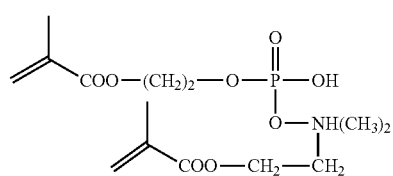

Phosphoric Acid Ester Monomer (C)

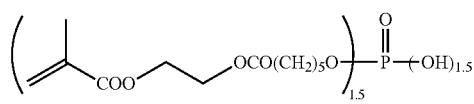

Samples No. 14 and 19 were manufactured by using a polymerizable acrylate available under the trade name EBECRYL3603 from DAICEL-CYTEC Co., Ltd.

Sample No. 18 was manufactured without adding any phosphoric acid ester monomer. Sample No. 20 was manufactured without providing the organic layers.

TABLE 1

| Sample | | Thickness of Organic Layer (μm) | Thickness of Inorganic Layer (nm) | a/b | Hardness (GPa) | Phosphoric acid monomer (A) | (B) | (C) | Tg °C. | Remark |
|---|---|---|---|---|---|---|---|---|---|---|
| No. 1 | Example | 0.55 | 50 | 11 | 0.2 | ○ | | | 80 | |
| No. 2 | Example | 1 | 50 | 20 | 0.2 | ○ | | | 80 | |
| No. 3 | Comparative Example | 0.3 | 30 | 10 | 0.2 | ○ | | | 80 | |
| No. 4 | Comparative Example | 0.2 | 18 | 11 | 0.2 | ○ | | | 80 | |
| No. 5 | Example | 0.55 | 50 | 11 | 0.03 | ○ | | | 80 | |
| No. 6 | Comparative Example | 0.55 | 50 | 11 | 0.02 | ○ | | | 80 | |
| No. 7 | Example | 0.55 | 50 | 11 | 0.5 | ○ | | | 80 | |
| No. 8 | Comparative Example | 0.55 | 50 | 11 | 0.6 | ○ | | | 80 | |
| No. 9 | Example | 5 | 165 | 30 | 0.2 | ○ | | | 80 | |
| No. 10 | Example | 4 | 135 | 30 | 0.2 | ○ | | | 80 | |
| No. 11 | Example | 5 | 165 | 30 | 0.2 | | | ○ | 80 | |
| No. 12 | Example | 4 | 135 | 30 | 0.2 | | | ○ | 80 | |
| No. 13 | Example | 5 | 175 | 29 | 0.2 | | | ○ | 80 | |
| No. 14 | Example | 5 | 165 | 30 | 0.2 | | | ○ | 110 | |
| No. 15 | Example | 10 | 335 | 30 | 0.2 | ○ | | | 80 | |
| No. 16 | Example | 10 | 335 | 30 | 0.2 | | | ○ | 80 | |
| No. 17 | Comparative Example | 11 | 365 | 30 | 0.2 | ○ | | | 80 | |
| No. 18 | Example | 10 | 335 | 30 | 0.2 | | ○ | | 80 | |
| No. 19 | Comparative Example | — | 50 | — | — | — | | | | No Organic Layer |

TABLE 2

| Sample | | Barrier Performance (g/m2/day) | Adhesiveness | Bending Resistance (mm) | Scratch Resistance |
|---|---|---|---|---|---|
| No. 1 | Example | Lower than Detection Limit | ○ | 10 | ○ |
| No. 2 | Example | Lower than Detection Limit | ○ | 8 | ○ |
| No. 3 | Comparative Example | Lower than Detection Limit | ○ | 11 | ○ |
| No. 4 | Comparative Example | 0.05 | ○ | 10 | ○ |
| No. 5 | Example | Lower than Detection Limit | ○ | 7 | ○ |
| No. 6 | Comparative Example | Lower than Detection Limit | ○ | 7 | x |
| No. 7 | Example | Lower than Detection Limit | ○ | 10.5 | ○ |
| No. 8 | Comparative Example | Lower than Detection Limit | ○ | 14 | ○ |
| No. 9 | Example | Lower than Detection Limit | ○ | 6.5 | ○ |
| No. 10 | Example | Lower than Detection Limit | ○ | 6.5 | ○ |
| No. 11 | Example | Lower than Detection Limit | ○ | 3.5 | ○ |
| No. 12 | Example | Lower than Detection Limit | ○ | 6 | ○ |
| No. 13 | Example | Lower than Detection Limit | ○ | 6 | ○ |
| No. 14 | Example | Lower than Detection Limit | ○ | 7 | ○ |
| No. 15 | Example | Lower than Detection Limit | ○ | 6 | ○ |
| No. 16 | Example | Lower than Detection Limit | ○ | 3 | ○ |
| No. 17 | Comparative Example | 0.02 | ○ | 6 | ○ |
| No. 18 | Example | Lower than Detection Limit | ○ | 6 | ○ |
| No. 19 | Comparative Example | Lower than Detection Limit | ○ | 16 | ○ |

As is clear from Tables in the above, the gas barrier films which satisfied the requirements specified by the present invention were found to be excellent in barrier performance, adhesiveness, bending resistance and scratch resistance.

In particular, the samples satisfied all of the requirements such that the organic layer laid under the inorganic layer was formed by using the (meth)acrylate-base compound having a phosphate ester group represented by formula (1); that the glass transition temperature of the organic layer was adjusted to 100° C. or below; that the organic layer laid under the inorganic layer, assumed to have a thickness "a", and the inorganic layer on the organic layer, assumed to have a thickness "b", satisfied a relation of a/b≧30; and that the thickness of the organic layer laid under the inorganic layer fell in the range from 5 μm to 10 μm (samples No. 11 and sample No. 16) were found to be remarkably improved in the bending resistance, as compared with the samples which lack any one of these requirements (samples No. 12 to 15, 18). The effects of improvement were almost doubled, and were proven to be very meaningful.

Example 2

Manufacturing and Evaluation of Organic EL Device
(2-1) Manufacturing of Organic EL Device An electro-conductive glass substrate having an ITO film formed thereon (surface resistivity=10Ω/□) was cleaned with 2-propanol, and subjected to UV-ozone treatment for 10 minutes. On the substrate (anode), organic compound layers listed below were sequentially deposited by vacuum evaporation.

| (First Hole Transport Layer) | |
|---|---|
| Copper phthalocyanine (Second Hole Transport Layer) | 10 nm thick |
| N,N'-diphenyl-N,N'-dinaphthylbenzidine (Emitter Layer also used as Electron Transport Layer) | 40 nm thick |
| Tris(8-hydroxyquinolinato)aluminum | 60 nm thick |

Lastly, a 1-nm thick lithium fluoride layer and a 100-nm thick metal were sequentially deposited by vacuum evaporation to form a cathode, and a 5-μm thick silicon nitride film was further deposited thereon by parallel plate electrode CVD, to thereby manufacture an organic EL device.

(2-2) Placement of Gas Barrier Layer on Organic EL Device

Sample No. 1 of the barrier film was stuck with the EL device using a thermosetting adhesive (Epo-Tek 310, from DAIZO-Nichimoly), and the product was heated at 65° C. for 3 hours so as to cure the adhesive. In this way, 20 products of sealed organic EL device were manufactured.

(2-3) Evaluation of Luminescent Surface Quality of Organic EL Device

The organic EL devices as manufactured were allowed to cause luminescence under an applied voltage of 7 V using SMU2400 Source-Measure unit from Keithley Instruments Inc. It was confirmed by microscopic observation of the luminescent surfaces that all devices gave uniform luminescence without showing dark spots.

The individual devices were then allowed to stand in a dark room at 60° C., 90% RH (relative humidity) for 500 hours, and the luminescent surfaces were observed. Failure rate, which is defined as ratio of the number of devices having a dark spot of 300 μm or larger diameter observed therein, was measured. The failure rate was found to be 1% or smaller.

The present invention more successfully prevents the gas barrier film, adopted to organic EL devices or the like, from getting scratch on the surface thereof, which has been anticipated in the process of manufacturing device panels.

In particular, in the present invention, handlability of the gas barrier film, in the process of manufacturing the organic EL devices or the like, may be improved. This is because the gas barrier film of the present invention is excellent in bending resistance, so that the slitting margin in the process of cutting may be reduced typically to 5 mm or smaller, and the film is less likely to flaw. The gas barrier film of the present invention does not always limit materials for composing the organic layers and the inorganic layers, and is therefore widely adoptable.

In addition, since the gas barrier film of the present invention may be suppressed from producing flashing on the edges thereof, so that pollution of the process otherwise possibly induced by particles may be avoidable.

The present disclosure relates to the subject matter contained in Japanese Patent Application No. 070661/2010 filed on Mar. 25, 2010, which is expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A gas barrier film comprising a substrate film, an organic layer and an inorganic layer in that order, and the inorganic layer being provided directly on the surface of the organic layer,
wherein the inorganic layer is an aluminum oxide layer and has a thickness of 50 to 400 nm;
wherein the organic layer laid under the inorganic layer has a thickness of 5 μm to 10 μm;
the organic layer laid under the inorganic layer has a hardness, measured by the nanoindentation, of 0.03 GPa to 0.5 GPa; and
the organic layer laid under the inorganic layer, assumed to have a thickness "a", and the inorganic layer on the organic layer, assumed to have a thickness "b", satisfies a relation of a/b>30, wherein
the organic layer laid under the inorganic layer is obtained by curing a polymerizable composition which contains a (meth)acrylate-base compound expressed by the following formula (1):

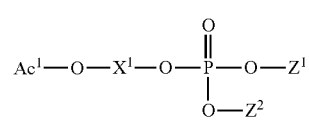

Formula (1)

wherein $Z^1$ represents an $Ac^2$—O—$X^2$— or hydrogen atom; $Z^2$ represents an $Ac^3$—O—$X^3$— or hydrogen atom; each of $Ac^1$, $Ac^2$ and $Ac^3$ independently represents an acryloyl group or a methacryloyl group; and each of $X^1$, $X^2$ and $X^3$ independently represents an alkylene group, an alkyleneoxy group, an alkyleneoxycarbonyl group, an alkylenecarbonyloxy group, or a group of a combination of these groups; and
the organic layer laid under the inorganic layer has a glass transition temperature of 100° C. or below.

2. The gas barrier film of claim 1, wherein the organic layer has a glass transition temperature of 85° C. or lower.

3. The gas barrier film of claim 1, further comprising an adhesive layer formed on the substrate film.

4. The gas barrier film of claim 1, further comprising an organic layer directly on the surface of the inorganic layer.

5. The gas barrier film of claim 4, wherein the organic layer on the inorganic layer has the same composition as the composition of the organic layer laid under the inorganic layer.

6. The gas barrier film of claim 1, further comprising an adhesive layer formed directly on the surface of the substrate film.

7. The gas barrier film of claim 1, wherein the polymerizable composition comprises the (meth)acrylate-base compound expressed by the formula (1) and a (meth)acrylate-base compound composed only of carbon atoms, oxygen atoms and hydrogen atoms.

8. A device having the gas barrier film described in of claim 1.

9. The device of claim 8, configured as an organic EL device or as a solar battery device.

10. The gas barrier film of claim 1, comprising at least two layers of the organic layer and at least two layers of the inorganic layer alternately.

11. The gas barrier film of claim 10, wherein each of the organic layers has a glass transition temperature of 85° C. or lower.

12. The gas barrier film of claim 10, further comprising an adhesive layer formed on the substrate film.

13. The gas barrier film of claim 10, further comprising an adhesive layer formed directly on the surface of the substrate film.

14. The gas barrier film of claim 10, wherein the polymerizable composition comprises the (meth)acrylate-base compound expressed by the formula (1) and a (meth)acrylate-base compound composed only of carbon atoms, oxygen atoms and hydrogen atoms.

15. A device having the gas barrier film described in of claim 10.

16. The device of claim 15, configured as an organic EL device or as a solar battery device.

* * * * *